United States Patent [19]

Aoki et al.

[11] Patent Number: 5,364,888

[45] Date of Patent: Nov. 15, 1994

[54] UV LIGHT-CURABLE EPOXY-FUNCTIONAL ORGANOPOLYSILOXANE/POLYETHER COMPOSITION RELEASE

[75] Inventors: Shunji Aoki; Yasuaki Hara, both of Annaka, Japan

[73] Assignee: Shin-Etsu Chemical Co., Ltd., Tokyo, Japan

[21] Appl. No.: 756,009

[22] Filed: Sep. 6, 1991

[30] Foreign Application Priority Data

Sep. 17, 1990 [JP] Japan ................... 2-246844

[51] Int. Cl.$^5$ .................. C08F 2/50; C08G 77/04; C08G 77/14
[52] U.S. Cl. .................... 522/31; 522/170; 528/14; 528/25
[58] Field of Search .......... 522/170, 31; 528/14, 528/25

[56] References Cited

U.S. PATENT DOCUMENTS

| | | | |
|---|---|---|---|
| 4,186,108 | 1/1980 | Carlson et al. | 522/170 |
| 4,318,766 | 3/1982 | Smith | 522/170 |
| 4,370,358 | 1/1983 | Hayes et al. | 522/31 |
| 4,421,904 | 12/1983 | Eckberg et al. | 528/27 |
| 4,537,944 | 8/1985 | Imai et al. | 528/18 |
| 4,547,431 | 10/1985 | Eckberg | 522/31 |
| 4,857,562 | 8/1989 | Wacker et al. | 522/170 |
| 4,885,319 | 12/1989 | Dougherty et al. | 522/170 |
| 5,057,358 | 10/1991 | Riding et al. | 522/31 |

FOREIGN PATENT DOCUMENTS 0391162 10/1990 European Pat. Off. .
64186 1/1989 Japan .

*Primary Examiner*—Susan W. Berman
*Attorney, Agent, or Firm*—Lowe, Price, LeBlanc & Becker

[57] ABSTRACT

A UV light-curable organopolysiloxane composition which comprises (A) 100 parts by weight of an organopolysiloxane having at least one functional epoxy group in one molecule, (B) from 1 to 100 parts by weight of a polyether compound of the formula, $R^1$—$(OR^2)_n$—$OR^3$, wherein $R^1$ represents an alkyl or alkenyl group having from 1 to 8 carbon atoms, $R^2$ represents an alkylene group having from 2 to 4 carbon atoms, $R^3$ represents a hydrogen atom or an alkyl or alkenyl group having from 1 to 8 carbon atoms, and n is an integer of from 1 to 50, and (C) from 0.01 to 40 parts by weight of all onium salt photoinitiator.

13 Claims, No Drawings

UV LIGHT-CURABLE EPOXY-FUNCTIONAL ORGANOPOLYSILOXANE/POLYETHER COMPOSITION RELEASE

BACKGROUND OF THE INVENTION

1. Field of The Invention

This invention relates to organopolysiloxane compositions and more particularly, to ultraviolet light-curable organopolysiloxane compositions which are readily curable by irradiation of UV light at room temperature within a short time and are useful for release paper.

2. Description of The Prior Art

It is known that organopolysiloxane compositions are applied onto an appropriate substrate and irradiated with UV light to cure the coating, thereby forming a thin film of the silicone cured product. The organopolysiloxane composition used for this purpose has been proposed, for example, in Japanese Laid-open Patent Application No. 56-38350. The composition set forth in this application is comprised of an organopolysiloxane having an epoxy functional group in the molecule and an onium salt photoinitiator.

The onium salt initiator is sparingly dissolved in the epoxy group-containing organopolysiloxane. When the initiator and the organopolysiloxane are mixed together, the resultant mixture is not uniform wherein the photoinitiator is readily separated or settled down. If such a mixture is applied onto a substrate, the coated film becomes opaque. In this condition, if UV light is applied, uniform transmission through the film is not possible, resulting in a non-uniform degree of curing of the film.

To avoid this, attempts have been made to improve the miscibility of the epoxy group-containing organopolysiloxane and the onium salt photoinitiator. In such attempts, there have been proposed in Japanese Laid-open Patent Application Nos. 64-186 and 64-29486 polyorganosiloxane compositions wherein functional hydroxyl group-bearing organic group, or polyether-polymethylene groups are introduced into the epoxy group-bearing organopolysiloxane. In order to prepare such polyorganosiloxanes, it is necessary to prepare the epoxy group-bearing organopolysiloxane through addition reaction between epoxy compounds having an ethylenically unsaturated bond and an organohydrogenpolysiloxane while subjecting simultaneously to hydrosilylation reaction of a hydroxyl group-containing compound having an ethylenically unsaturated bond or a polyether compound having an ethylenically unsaturated bond. This is not advantageous in that the reaction does not proceed in an efficient manner unless it is carried out under severely controlled conditions, with a low yield of intended product.

For improving the miscibility of the epoxy group-bearing organopolysiloxane and the onium salt photoinitiator, there has also been proposed modification of the organopolysiloxane with carboxylic acids such as benzoic acid (Japanese Laid-open Patent Application No. 1-297421). In the case, removal of the unreacted carboxylic acid after modification therewith is difficult. If the acid is left, the polymerization of the polysiloxane through the epoxy group will be induced, thus presenting a problem on the storage stability. In addition, another problem will be involved in that the cured film obtained from the modified epoxy group-bearing organopolysiloxane is more liable to undergo tight release than that obtained from non-modified organopolysiloxane.

SUMMARY OF THE INVENTION

It is therefore an object of the invention to provide a UV light-curable organopolysiloxane composition of the type which comprises an epoxy group-bearing organopolysiloxane and an onium salt photoinitiator, to which a polyether compound is added so that the miscibility of the organopolysiloxane and the onium salt is significantly improved.

It is another object of the invention to provide a UV light-curable organopolysiloxane composition from which a uniform cured film can be readily obtained by irradiation of a coating film of the organopolysiloxane composition with UV light.

The above objects can be achieved, according to the invention, by a UV light-curable organopolysiloxane composition which comprises:

(A) 100 parts by weight of an organopolysiloxane having at least one functional epoxy group in one molecule;

(B) from 1 to 100 parts by weight of a polyether compound of the formula, $R^1-(OR^2)_n-OR^3$, wherein $R^1$ represents an alkyl or alkenyl group having from 1 to 8 carbon atoms, $R^2$ represents an alkylene group having from 2 to 4 carbon atoms, $R^3$ represents a hydrogen atom or an alkyl or alkenyl group having from 1 to 8 carbon atoms, and n is an integer of from 1 to 50; and (C) from 0.01 to 40 parts by weight of an onium salt photoinitiator.

It has been found that in order to improve the miscibility of an epoxy group-bearing organopolysiloxane (A) and an onium salt photoinitiator (C), a polyether compound (B) of the formula defined above is very effective. The onium salt is very soluble in the polyether compound and the resultant solution has very high affinity for the organopolysiloxane. When these three ingredients (A), (B) and (C) are mixed at defined ratios, a uniform solution can be obtained. This results in a uniform cured film after irradiation with UV light.

DETAILED DESCRIPTION AND EMBODIMENTS OF THE INVENTION

The UV light-curable organopolysiloxane composition of the invention has an improved miscibility of an onium salt photoinitiator with an epoxy group-containing organopolysiloxane. The composition comprises (A) an epoxy group-bearing organopolysiloxane, (B) a polyether compound of the specific type, and (C) an onium salt photoinitiator.

The organopolysiloxane (A) should have at least one epoxy group in the molecule. This ingredient should preferably have a viscosity at 25° C. of from 50 to 3,000 cps.

Preferably, the organopolysiloxane is of the general formula (1)

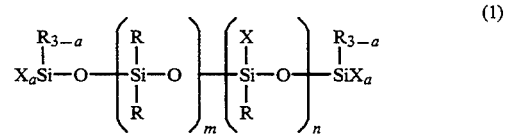

wherein R independently represents an unsubstituted or substituted monovalent hydrocarbon group including an alkyl group having from 1 to 10 carbon atoms such as, for example, a methyl group, an ethyl group, a propyl group, a butyl group, an octyl group or the like, a cycloalkyl group such as a cyclohexyl group, an alkenyl group having from 1 to 10 carbon atoms such as a vinyl group, an allyl group or the like, an aryl group such a phenyl group, a tolyl group or the like, or those groups mentioned above but substituted at part or all of the hydrogen atoms, which are joined to the carbon atom or atoms, with a halogen atom, a cyano group, a hydroxyl group, an alkoxy group or the like, e.g. a chloromethyl group, a trifluoropropyl group, a cyanoethyl group, a hydroxyethyl group, a methoxyethyl group or the like, and X represents an epoxy functional group such as γ-glycidyloxypropyl group of the formula,

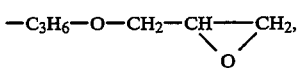

β-(glycidyloxycarbonyl)propyl group of the formula,

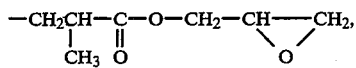

and β-(3,4-epoxycyclohexyl)ethyl group of the formula,

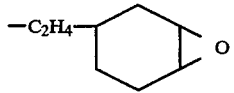

and β-(4-methyl-3,4-epoxycyclohexyl)propyl group of the formula,

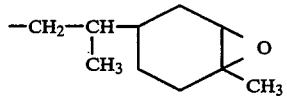

and the like. Each R is preferably an alkyl group defined above and more preferably, a methyl group.

In view of the ease in preparation, a is a value of 0 or 1. With regard to n and m, when the viscosity of the organopolysiloxane is less than 50 cps. or over 3,000 cps., the coating properties to substrates are considerably lowered. Accordingly, the value of m+n should be sufficient to keep the viscosity within a range of from 50 to 3,000 cps. The value of n/(n+m) is not critical but is preferably within a range of from 0.01 to 0.20 in order to ensure good release properties of the cured film obtained from the composition against an adhesive substance.

The epoxy group-containing organopolysiloxane is not limited to the linear polysiloxane of the formula (1) and may be an organopolysiloxane having a branched structure in the siloxane chain sequence and represented by the following general formula (2)

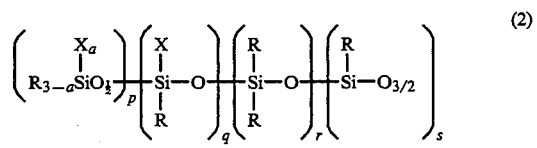

wherein R and X have, respectively, the same meanings as defined with respect to the formula (1), a is a value of 0 or 1, and p+q+r+s is a value sufficient to provide a viscosity of the resultant organopolysiloxane of from 50 to 3,000 cps., at 25° C., and a value of (p+q)/(p+q+r+s) is within a range of from 0.01 to 0.20.

The polyether compound which is a (B) ingredient of the curable organopolysiloxane composition of the invention is of the following general formula (3)

wherein $R^1$ represents an alkyl group having from 1 to 8 carbon atoms such as a methyl group, an ethyl group, a propyl group or the like, or an alkenyl group having from 1 to 8 carbon atoms such as, for example, a vinyl group, an allyl group or the like, $R^2$ which may be the same or different represent an alkylene group having from 2 to 4 carbon atoms such as an ethylene group, a propylene group or a butylene group, provided that those groups represented by $R^1$ and $R^2$ may be substituted at part or all of the hydrogen atoms joined to the carbon atoms with a halogen atom, a cyano group, a hydroxyl group or an alkoxy group, such as, for example, a trifluoromethyl group, a cyanoethyl group, a hydroxyethyl group or the like with respect to $R^1$, and $R^3$ represents a hydrogen atom or an alkyl or alkenyl group defined with respect to $R^1$.

Specific examples of the polyether compound include polyether compounds such as ethylene glycol dimethyl ether, ethylene glycol diethyl ether, ethylene glycol dibutyl ether, propylene glycol diethyl ether, diethylene glycol dimethyl ether, diethylene glycol diethyl ether, dipropylene glycol dimethyl ether, dipropylene glycol diethyl ether, triethylene glycol dimethyl ether, tripropylene glycol dimethyl ether, ethylene glycol allyl methyl ether, 2-chloroethyl vinyl ether, 1,2-bis(2-chloroethoxy)ethane, triethylene glycol divinyl ether and the like, and glycol mono ether compounds such as ethylene glycol monomethyl ether, ethylene glycol monobutyl ether, propylene glycol monomethyl ether, propylene glycol monoethyl ether, diethylene glycol monomethyl ether, diethylene glycol monoethyl ether, triethylene glycol monomethyl ether, tripropylene glycol monomethyl ether, ethylene glycol monoallyl ether, diethylene glycol monoallyl ether and the like. The glycol mono ether compounds may be represented by the formula (3) wherein $R^3$ is hydrogen and more particularly, by the formula, $R^1(OR^2)_nOH$, wherein $R^1$, $R^2$ and n have, respectively, the same meanings as defined with respect to the formula (3). These polyether compounds may be used singly or in combination. Of these, ethylene glycol monomethyl ether and diethylene glycol monomethyl ether are preferred.

When the amount of the polyether compound exceeds 100 parts by weight per 100 parts by weight of the epoxy group-bearing organopolysiloxane (A), there is some possibility that the organopolysiloxane phase and the polyether compound phase separate from each other in the composition. This entails insufficient curability upon irradiation with UV light. On the other hand, if the amount is less than 1 part by weight, the effect of the addition is not significant, so that a uniform composition is difficult to obtain. Accordingly, the amount of the polyether compound should be in the range of from 100 parts by weight to 1 part by weight, preferably from 60 parts by weight to 5 parts by weight, per 100 parts by weight of the organopolysiloxane compound.

The onium salt photoinitiator which is the (C) ingredient may be one which is known in the art. Examples of the onium salts include diaryliodonium salts of the formula, $R^4{}_2I^+X^-$, triarylsulfonium salts of the formula, $R^4{}_3S^+X^-$, triarylselenium salts of the formula, $R^4{}_3Se^+X^-$, tetraarylphosphonium salts of the formula, $R^4{}_4P^+X^-$ and aryldiazonium salts of the formula, $R^4N_2^+X^-$, wherein $R^4$ represents an aryl group and $X^-$ represents a non-nucleophilic and non-basic anion such as $SbF_6^-$, $AsF_6^-$, $PF_6^{1}$, $BF_6^-$, $HSO_4^-$, $ClO_4^-$ or the like. Of these, the diaryliodonium salts and triarylsulfonium salts are preferred.

When the amount of the onium salt photoinitiator is less than 0.01 part by weight per 100 parts by weight of the organopolysiloxane, the curability becomes insufficient. When the amount exceeds 40 parts by weight, the curability is improved but surface properties of a cured film are adversely influenced, with an attendant problem that the release properties are degraded. Accordingly, the amount should be in the range of from 0.01 to 40 parts by weight per 100 parts by weight of the organopolysiloxane. Preferably, the amount is in the range of from 0.1 to 20 parts by weight.

The UV light-curable organopolysiloxane composition of the invention is obtained by uniformly mixing the ingredients (A) to (C) in predetermined amounts. If necessary, the composition may further comprise reactive diluents such as epoxy monomers, adhesion improvers to substrates, leveling agents, antistatic agents, de-foaming agents, pigments and the like. The composition may be used after dilution with organic solvents.

Since the composition of the invention is readily cured by irradiation with UV Light within a short time, it can be used as a back coating agent for adhesive tapes, a protective coating agent for metals or plastics, or a coating base. In applications, the composition is coated on paper sheets, various plastic films, metallic foils such as an aluminum foil or the like, by the use of bar coaters, gravure coaters, reverse coaters or by spraying techniques in a thickness of from 0.1 to 20 micrometers. The thus coated film is irradiated with UV light to readily cure the film within a short time.

The light source of UV light may be mercury arc lamps, middle pressure mercury lamps, high pressure mercury lamps, metal halide lamps and the like. For the curing of the film, when a high pressure mercury lamp (80 W/cm) is used at a distance from the film of 8 cm, for example, the irradiation for 0.02 to 10 seconds is sufficient.

The present invention is described by way of examples wherein parts are by weight. Comparative examples are also described. In the examples, the viscosity is a value measured at 25° C. The release force, residual adhesion rate and curability were measured according to the following procedures, respectively.

Release Force

An organopolysiloxane composition was applied onto the surface of a polyethylene laminate paper sheet in an amount of 0.8 g/cm², followed by irradiation with UV light having a predetermined intensity to form a cured film. Thereafter, a solvent-type acrylic adhesive (Oribain BPS-8170, available from Toyo Inks Manufacturing Co., Ltd.) or an acrylic emulsion adhesive (Oribain BPW-3110H, available from Toyo Inks Mfg. Co., Ltd.) was applied onto the cured film surface and thermally treated at 100° C. for 3 minutes. Subsequently, a wood free paper with a weight basis of 64 g/m² was placed on and bonded with the adhesive, followed by aging under a load of 20 g/cm² for 20 hours. The sample was cut into pieces with 5 cm in width and the attached paper was pulled by the use of a tensile tester at an angle of 180° at a pulling rate of 0.3 m/minute to determine a force (g/5 cm) required for the release.

Residual Adhesion Rate

In the same manner as with the measurement of the release force, a cured film of an organopolysiloxane composition was formed on a substrate surface. Thereafter, a polyester self-adhesive tape (Lumirror 31B, available from Nitto Denko K. K.) was applied on the cured film and aged under a load of 20 g/cm² at 70° C. for 20 hours. The tape was peeled off and attached to a teflon sheet.

The force (g) required to separate or release the tape from the teflon sheet was measured at an angle of 180° at a separation rate of 0.3 m/minute.

The above procedure was repeated except that the cured film was replaced by a fresh teflon sheet, thereby determining a release force. The ratio of the former force to the latter force is determined as a residual adhesion force or rate.

This means that a higher rate leads to a less ratio of uncured portion, so that the self-adhesion force of the tape is not lowered by migration of the silicone to the self-adhesive.

Curability

An organopolysiloxane composition was applied onto a polyethylene laminated paper sheet by the use of an offset transfer machine in a thickness of about 3 micrometers. The applied composition was cured by irradiation of UV light from a 2 KW high pressure mercury lamp (80 W/cm) at a distance of 8 cm from the sample for 0.3 seconds. The cured film was strongly rubbed with fingers ten times whereupon the film which was free of any smear or rubbing-off was judged as cured.

Examples 1 to 5 and Comparative Examples 1 and 2

An epoxy group-bearing organopolysiloxane of the following average compositional formula

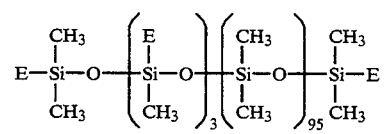

wherein E is

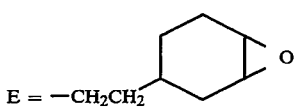

(hereinafter referred to simply as organopolysiloxane I) was mixed with a polyether compound including diethylene glycol dimethyl ether, diethylene glycol monomethyl ether or ethylene glycol monomethyl ether, and bis(n-dodecylphenyl)iodonium hexafluoroantimonate (hereinafter referred to simply as iodonium salt photoinitiator I) in amounts indicated in Table 1, followed by mixing to obtain UV light-curable release compositions I to VII. These compositions were checked with respect to the miscibility of the organopolysiloxane I with the iodonium photoinitiator. The results are shown in Table 2.

The curability of the thus obtained UV-curable release compositions was determined along with the residual adhesion rate and the release force of cured films which were obtained by applying each of the release compositions onto a polyethylene laminated paper in a film thickness of about 1 micrometer and irradiating the film with UV light from a 2 KW high pressure mercury lamp (80 W/cm) at a distance of 8 cm from the film for 0.4 seconds. The results are also shown in Table 2.

As will be apparent from the results, the compositions of the invention using the polyether compounds are better in miscibility and curability than comparative compositions which are free of any polyether compound. In addition, the compositions of the invention containing the polyether compound are not degraded with respect to the release characteristics.

uniform cured film. This is because the onium salt photoinitiator (C) is very soluble in the polyether compound (B) and the solution has good affinity for epoxy group-bearing organopolysiloxanes to obtain a uniform solution.

What is claimed is:

1. A UV light-curable organopolysiloxane release composition which comprises:
   (A) 100 parts by weight of an organopolysiloxane selected from the group consisting of organopolysiloxanes having the following formula

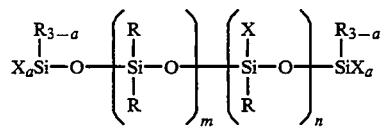

wherein R independently represents an unsubstituted or substituted monovalent hydrocarbon group, X represents an $\gamma$-glycidyloxypropyl group of the formula

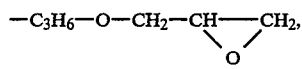

a $\beta$-(glycidyloxycarbonyl)propyl group of the formula

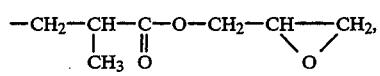

a $\beta$-(3,4-epoxycyclohexyl)ethyl group of the formula

TABLE 1

| Ex. No | UV-curable Release Composition No. | Amount of Organo-polysiloxane I (parts by wt.) | Amount of Polyether Compound (parts by wt.) | | | Amount of Iodonium Salt Photoinitiator (parts by weight) |
|---|---|---|---|---|---|---|
| | | | Diethylene Glycol Dimethyl Ether | Diethylene Glycol Monomethyl Ether | Ethylene Glycol Monomethyl Ether | |
| Example: | | | | | | |
| 1 | I | 90 | 10 | — | — | 3 |
| 2 | II | 90 | — | 10 | — | 3 |
| 3 | III | 90 | — | — | 10 | 3 |
| 4 | IV | 80 | — | — | 20 | 3 |
| 5 | V | 70 | — | — | 30 | 3 |
| Comparative Example: | | | | | | |
| 1 | VI | 40 | — | — | 60 | 3 |
| 2 | VII | 100 | — | — | — | 3 |

TABLE 2

| Ex. No. | UV-curable Release Composition No. | Miscibility | Curability (film thickness: 3 μm) | Residual Adhesion rate (%) | Release Force (g/5 cm) | |
|---|---|---|---|---|---|---|
| | | | | | BSP-8170 | BPW-3110H |
| Example: | | | | | | |
| 1 | I | good | very good | >99 | 22 | 21 |
| 2 | II | good | very good | >99 | 22 | 19 |
| 3 | III | good | very good | >99 | 25 | 20 |
| 4 | IV | very good | very good | >99 | 23 | 17 |
| 5 | V | good | very good | >99 | 26 | 17 |
| Comparative Example: | | | | | | |
| 1 | VI | poor | poor (not cured) | — | — | — |
| 2 | VII | poor | slightly poor | >99 | 29 | 23 |

The above results give evidence that the composition of the present invention is very effective in obtaining a

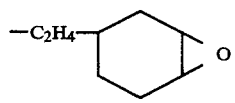

and a β-(4-methyl-3,4-epoxycyclohexyl) propyl group of the formula,

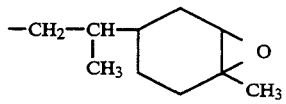

a is a value of 0 or 1, and m+n are a value sufficient to provide a viscosity of the organopolysiloxane of from 50 to 3,000 cps., at 25° C., and

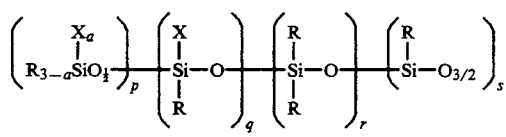

wherein R, X and a have, respectively, the same meanings as defined in the above-defined formula, and p+q+r+s is a value sufficient to provide a viscosity of the resultant organopolysiloxane of from 50 to 3,000 cps at 25° C. and the value of (p+q)/(p+q+r+s) is within a range of from 0.01 to 0.20;

(B) from 1 to 100 parts by weight of a polyether compound of the formula, $R^1$—$(OR^2)_n$—$OR^3$, wherein $R^1$ represents an alkyl or alkenyl group having from 1 to 8 carbon atoms, $R^2$ represents an alkylene group having from 2 to 4 carbon atoms, $R^3$ represents a hydrogen atom or an alkyl or alkenyl group having from 1 to 8 carbon atoms, and n is an integer of from 1 to 50; and (C) from 0.01 to 40 parts by weight of an onium salt photoinitiator.

2. The organopolysiloxane composition according to Claim 1, wherein said organopolysiloxane (A) is

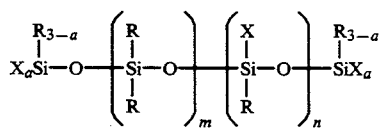

wherein R independently represents an unsubstituted or substituted monovalent hydrocarbon group, X represents an epoxy functional group selected from the group consisting of an γ-glycidyloxypropyl group of the formula

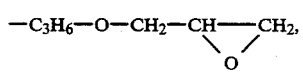

a β-(glycidyloxycarbonyl)propyl group of the formula

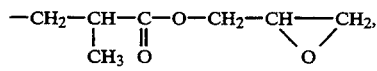

and a β-(3,4-epoxycyclohexyl)ethyl group of the formula

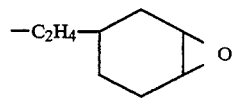

and a β-(4-methyl-3,4-epoxycyclohexyl)propyl group of the formula

a is a value of 0 or 1, and m +n are a value sufficient to provide a viscosity of the organopolysiloxane of from 50 to 3,000 cps., at 25° C.

3. The organopolysiloxane release composition according to claim 2, wherein R is an alkyl group having from 1 to 10 carbon atoms.

4. The organopolysiloxane release composition according to claim 3, wherein R is a methyl group.

5. The organopolysiloxane release composition according to claim 2, wherein n/(m+n) is a value of from 0.01 to 0.20.

6. The organopolysiloxane release composition according to claim 1, wherein said organopolysiloxane is

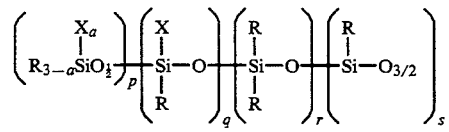

wherein R, X and a have, respectively, the same meanings as defined in claim 9, and p+q+r+s is a value sufficient to provide a viscosity of the resultant organopolysiloxane of from 50 to 3,000 cps., at 25° C., and a value of (p+q)/(p+q+r+s) is within a range of from 0.01 to 0.20.

7. The organopolysiloxane release composition according to claim 1, wherein said polyether compound (B) is of the following general formula, $R^1$—$(OR^2)_n$—$OR^3$, wherein $R^1$ represents an alkyl group having from 1 to 8 carbon atoms, or an alkenyl group having from 1 to 8 carbon atoms, $R^2$ may be the same or different and represents an alkylene group having from 2 to 4 carbon atoms provided that those groups represented by $R^1$ and $R^2$ may be substituted at part or all of the hydrogen atoms joined to the carbon atoms with a halogen atom, a cyano group, a hydroxyl group or an alkoxy group, and $R^3$ represents a hydrogen atom or an alkyl or alkenyl group having from 1 to 8 carbon atoms.

8. The organopolysiloxane release composition according claim 7, wherein $R^3$ is a hydrogen atom.

9. The organopolysiloxane release composition according to claim 7, wherein said polyether compound (B) is selected from the group consisting of ethylene glycol monomethyl ether and diethylene glycol monomethyl ether.

10. The organopolysiloxane release composition according to claim 1, wherein said onium salt photoinitiator is selected from the group consisting of diaryliodonium salts and triarylsulfonium salts.

11. The cured organopolysiloxane release composition according to claim 1.

12. The cured organopolysiloxane release composition according to claim 11, wherein said cured composition is in the form of a coating applied on a substrate.

13. A UV light-cured organopolysiloxane release composition which has been cured which comprises:

(A) 100 parts by weight of an organopolysiloxanes having the following formula

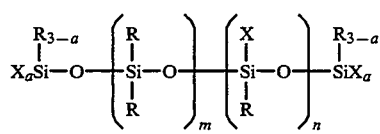

wherein R independently represents an unsubstituted or substituted monovalent hydrocarbon group, X represents an γ-glycidyloxypropyl group of the formula

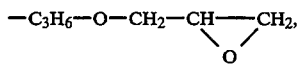

a β-(glycidyloxycarbonyl)propyl group of the formula

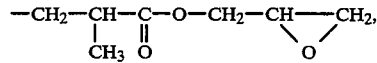

a β-(3,4-epoxycyclohexyl)ethyl group of the formula,

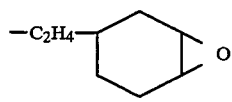

and a β-(4-methyl-3,4-epoxycyclohexyl)propyl group of the formula,

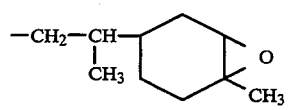

a is a value of 0 or 1, and m+n are a value sufficient to provide a viscosity of the organopolysiloxane of from 50 to 3,000 cps., at 25° C., and

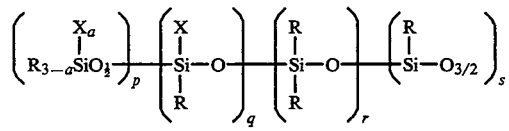

wherein R, X and a have, respectively, the same meanings as defined in the above-defined formula, and p+q+r+s is a value of (p+q)/(p+q+r+s) is within a range of from 0.01 to 0.20;

(B) from 1 to 100 parts by weight of a polyether compound of the formula, $R^1-(OR^2)_n-OR^3$, wherein $R^1$ represents an alkyl or alkenyl group having from 1 to 8 carbon atoms, $R^2$ represents an alkylene group having from 2 to 4 carbon atoms, $R^3$ represents a hydrogen atom or an alkyl or alkenyl group having from 1 to 8 carbon atoms, and n is an integer of from 1 to 50; and (C) from 0.01 to 40 parts by weight of an onium salt photoinitiator.

* * * * *